US012145328B2

United States Patent
Waugh et al.

(10) Patent No.: US 12,145,328 B2
(45) Date of Patent: Nov. 19, 2024

(54) SYSTEMS AND METHODS FOR ROTARY TENSIONING OF FIBROUS PREFORMS

(71) Applicant: ROHR, INC., Chula Vista (CA)

(72) Inventors: Katherine E. Waugh, San Diego, CA (US); Paul T Perea, Pueblo West, CO (US); Kyle Rosenbrock, Pueblo, CO (US); Christopher C Koroly, Spring Valley, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/991,699

(22) Filed: Nov. 21, 2022

(65) Prior Publication Data

US 2024/0165894 A1   May 23, 2024

(51) Int. Cl.
| | |
|---|---|
| *B29C 70/46* | (2006.01) |
| *B29C 70/54* | (2006.01) |
| *B29C 70/56* | (2006.01) |
| *B29K 105/06* | (2006.01) |

(52) U.S. Cl.
CPC ............ *B29C 70/46* (2013.01); *B29C 70/541* (2013.01); *B29C 70/56* (2013.01); *B29K 2105/06* (2013.01)

(58) Field of Classification Search
CPC ....... B29C 70/46; B29C 70/345; B29C 70/56; B29C 70/541
See application file for complete search history.

(56) References Cited

U.S. PATENT DOCUMENTS

| | | | |
|---|---|---|---|
| 8,985,995 B2 | 3/2015 | De Mattia et al. | |
| 11,267,207 B2 | 3/2022 | Orlov | |
| 2003/0146543 A1* | 8/2003 | Lebrun | ................... B29C 70/56 |
| | | | 425/398 |
| 2014/0190047 A1* | 7/2014 | McCoy | .................. A41H 15/00 |
| | | | 38/102.91 |

(Continued)

FOREIGN PATENT DOCUMENTS

| | | |
|---|---|---|
| DE | 102012010497 | 12/2012 |
| DE | 102012021738 | 4/2014 |
| EP | 4238750 | 9/2023 |

OTHER PUBLICATIONS

European Patent Office, Partial European Search Report dated Apr. 26, 2024 in Application No. 23209545.5.

(Continued)

*Primary Examiner* — Jerzi H Moreno Hernandez
(74) *Attorney, Agent, or Firm* — SNELL & WILMER L.L.P.

(57) ABSTRACT

A shape forming tool for pre-carbonization compression of a fibrous preform is provided, comprising a female forming tool, a first plug, a second plug, and a wedge, each configured to be received by a die recess of the female forming tool. A first tapered surface of the wedge is configured to engage the first plug and the second tapered surface of the wedge is configured to engage the second plug. In response to the first tapered surface of the wedge engaging the first plug and the second tapered surface of the wedge engaging the second plug, the first plug and the second plug, respectively, are configured to move laterally towards opposing sides of the female forming tool and/or vertically toward a bottom side of the female forming tool to compress the fibrous preform into a shaped body.

7 Claims, 14 Drawing Sheets

(56) References Cited

U.S. PATENT DOCUMENTS

| | | | | |
|---|---|---|---|---|
| 2015/0053333 A1* | 2/2015 | Prebil | ............... | B29C 70/345 |
| | | | | 156/464 |
| 2016/0325331 A1* | 11/2016 | Gane | ............... | B21D 5/06 |
| 2021/0060819 A1* | 3/2021 | Sekine | ............... | B29C 70/46 |
| 2021/0339483 A1* | 11/2021 | Werntges | ............... | B29C 70/46 |
| 2022/0009217 A1* | 1/2022 | Brockschmidt | ............... | B29C 70/56 |
| 2022/0402220 A1* | 12/2022 | Linck | ............... | B29C 70/46 |
| 2024/0140879 A1* | 5/2024 | Waugh | ............... | B29C 70/56 |

OTHER PUBLICATIONS

European Patent Office, European Search Report dated Jul. 18, 2024 in Application No. 23209545.5.

* cited by examiner

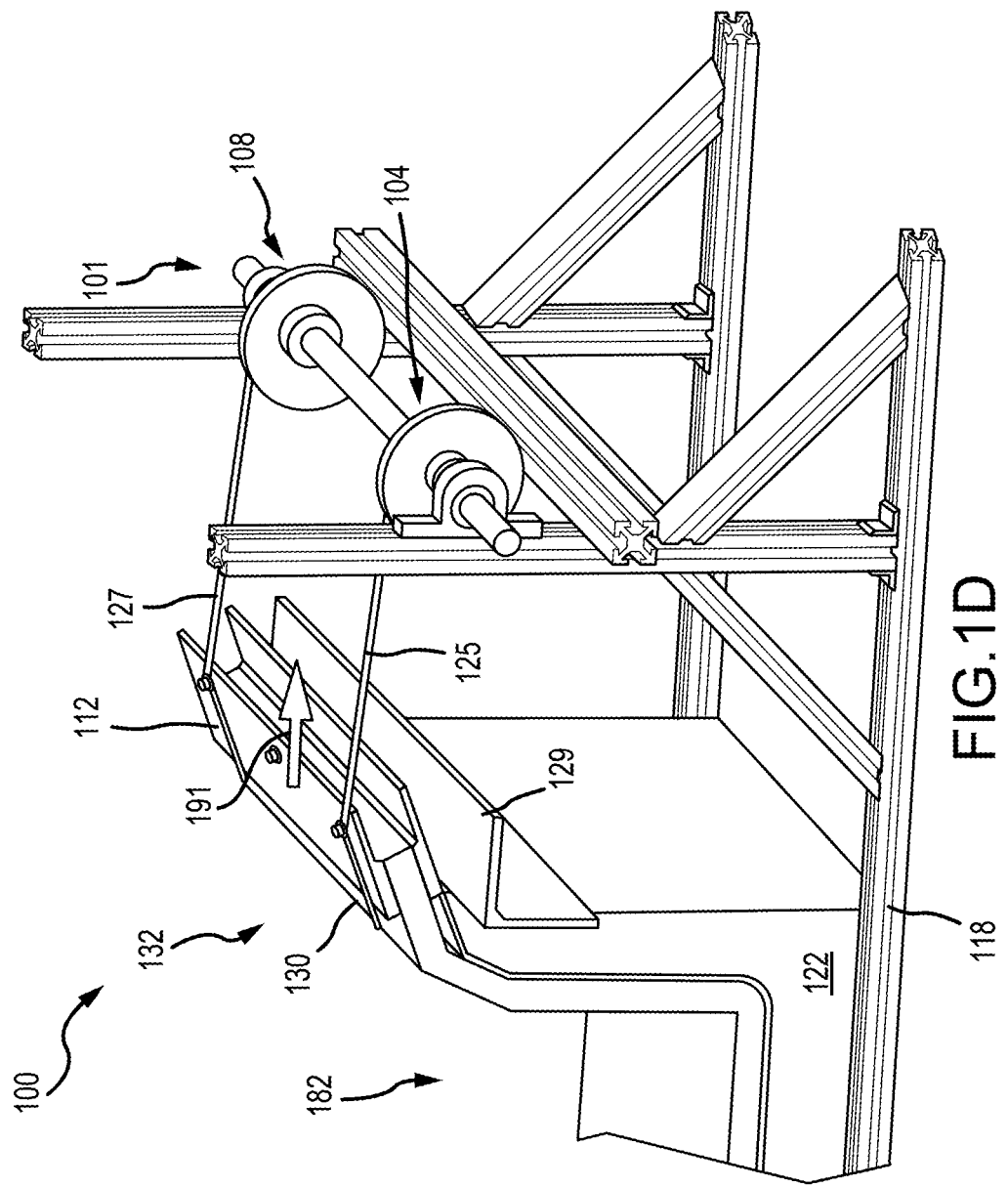

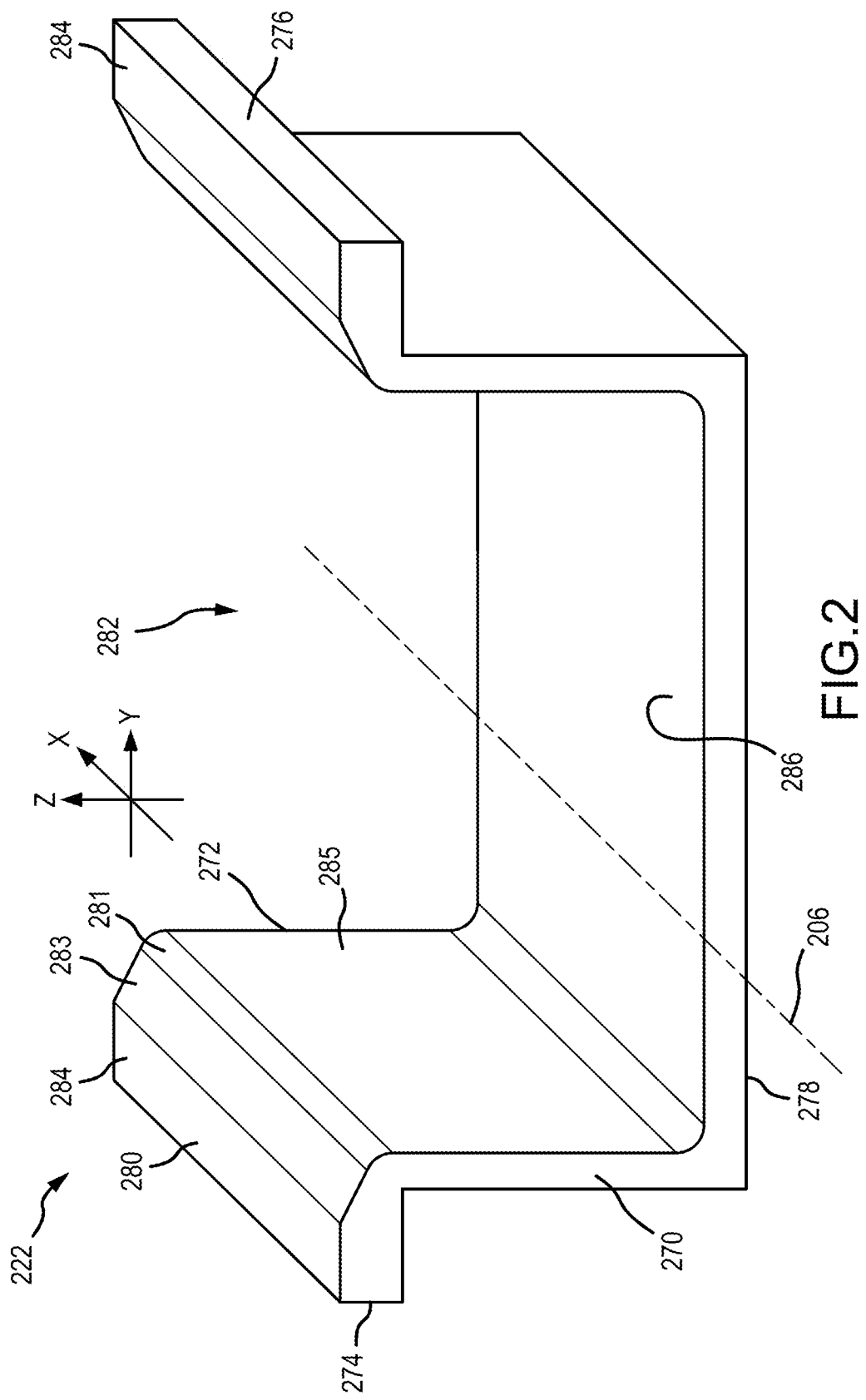

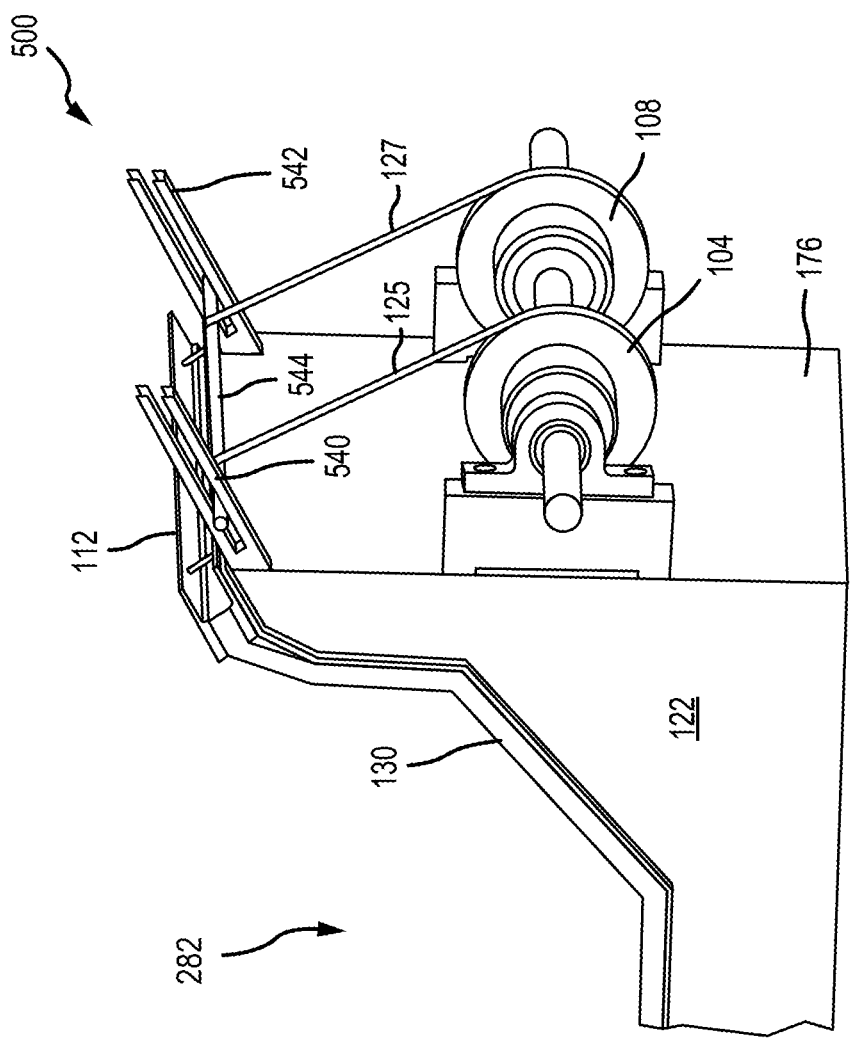

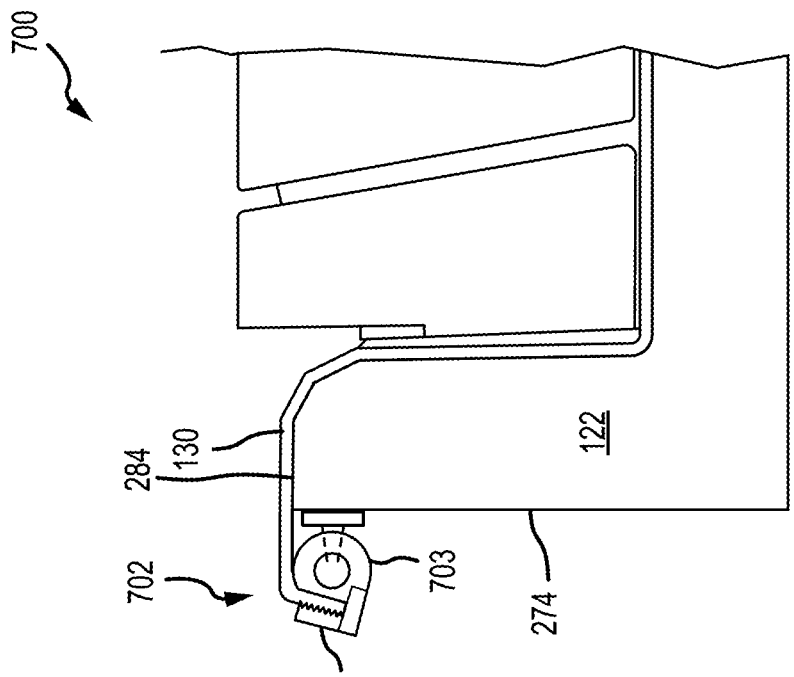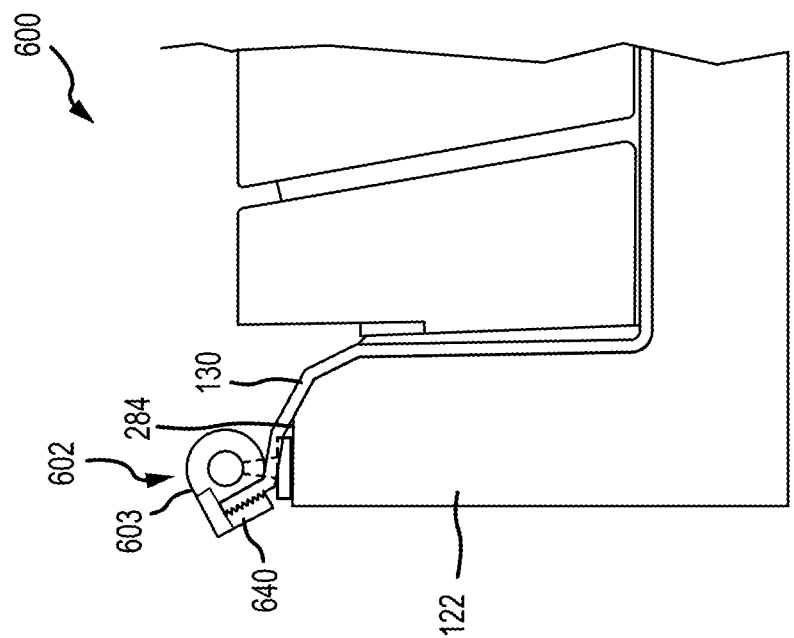

SYSTEMS AND METHODS FOR ROTARY TENSIONING OF FIBROUS PREFORMS

FIELD

The present disclosure relates to systems and methods for manufacturing composites, and more specifically, to systems and methods for shape forming composites.

BACKGROUND

Composite bodies are utilized in various industries, including the aerospace industry. Typically, one or more layers of a composite material are stacked together in a flat, planar configuration. These flat layers can undergo various pre-forming processing (e.g., needling, etc.). The preform is then typically moved to a mold for forming the preform into a desired shape. In the case of C/C (carbon/carbon) composites, the shaped preform is then typically moved to one or more other fixtures as it goes through carbonization and chemical vapor infiltration (CVI) densification processes.

SUMMARY

According to various embodiments, a method for forming a fibrous preform is disclosed, comprising disposing the fibrous preform over a forming tool, coupling a first side of the fibrous preform to a first rotary tensioner, moving the fibrous preform to conform to the forming tool, moving the first side of the fibrous preform with respect to the forming tool in response to moving the fibrous preform to conform to the forming tool, and applying a first tension to the fibrous preform via the first rotary tensioner as the fibrous preform is moved to conform to the forming tool.

In various embodiments, the method further comprises coupling a second side of the fibrous preform to a second rotary tensioner, moving the second side of the fibrous preform with respect to the forming tool in response to moving the fibrous preform to conform to the forming tool, and applying a second tension to the fibrous preform via the second rotary tensioner as the fibrous preform is moved to conform to the forming tool.

In various embodiments, the method further comprises clamping the first side of the fibrous preform with a first clamp, wherein the first rotary tensioner applies the first tension to the fibrous preform via the first clamp.

In various embodiments, the method further comprises clamping the second side of the fibrous preform with a second clamp, wherein the second rotary tensioner applies the second tension to the fibrous preform via the second clamp.

In various embodiments, the method further comprises rotating the first rotary tensioner in response to the first side of the fibrous preform moving with respect to the forming tool.

In various embodiments, moving the fibrous preform to conform to the forming tool comprises pushing the fibrous preform at least partially into a die recess of the forming tool.

In various embodiments, the method further comprises varying the first tension with the first rotary tensioner, wherein the first rotary tensioner comprises a rotary actuator.

In various embodiments, the first tension is a constant tension, and the first rotary tensioner comprises a constant tension pulley.

In various embodiments, disposing the fibrous preform over the forming tool comprises placing the fibrous preform onto a first preform support coupled to a first side of the forming tool and a second preform support coupled to a second side of the forming tool.

In various embodiments, the method further comprises reacting the first tension through a frame separate from the forming tool.

In various embodiments, the method further comprises reacting the first tension through the forming tool.

According to various embodiments, a system for shape forming a fibrous preform is disclosed, comprising a forming tool, a first rotary tensioner configured to be disposed at a first side of the forming tool, and a first clamp configured to be coupled to the first rotary tensioner. The first clamp is moveable with respect to the forming tool.

In various embodiments, the forming tool comprises a female forming tool comprising a die recess, the female forming tool extends longitudinally along a longitudinal centerline of the female forming tool between and to the first end of the female forming tool and a second end of the female forming tool, and the female forming tool extends laterally between and to a first side of the female forming tool and a second side of the female forming tool. The female forming tool can extend vertically between and to a bottom side of the female forming tool and a top side of the female forming tool. The die recess can extend vertically into the female forming tool from a first top surface and a second top surface of the female forming tool to a recess surface of the female forming tool, wherein the first top surface and the second top surface are arranged on opposing sides of the recess surface at the top side of the female forming tool. The die recess can extend longitudinally in the female forming tool between and to the first end of the female forming tool and the second end of the female forming tool. The die recess can extend laterally in the female forming tool between the first side of the female forming tool and the second side of the female forming tool.

In various embodiments, the first clamp is configured to be coupled to the first rotary tensioner via a first flexible member.

In various embodiments, the first rotary tensioner comprises at least one of a rotary actuator or a constant tension pulley.

In various embodiments, the system further comprises a second rotary tensioner configured to be disposed at a second side of the forming tool.

In various embodiments, the first rotary tensioner is configured to apply a first tension to the fibrous preform via the first clamp.

In various embodiments, the system further comprises a frame, wherein the first rotary tensioner is configured to be mounted to the frame.

In various embodiments, the system further comprises a first preform support configured to be coupled to the first side of the forming tool, and a second preform support configured to be coupled to a second side of the forming tool, wherein the first preform support and the second preform support provide a first surface and a second surface, respectively, for supporting the fibrous preform.

According to various embodiments, a system for shape forming a fibrous preform is disclosed, comprising a forming tool, a first support frame disposed at a first side of the forming tool, a second support frame disposed at a second side of the forming tool, a first rotary tensioner slidably coupled to the first support frame, whereby a position of the first rotary tensioner with respect to the forming tool is adjustable in a first dimension, and a second rotary tensioner coupled to the second support frame, whereby a position of the second rotary tensioner with respect to the forming tool is adjustable in the first dimension.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 1D is a partial perspective view of the shape forming system of FIG. 1C with the fibrous preform formed against a forming tool, in accordance with various embodiments;

FIG. 2 is a perspective view of a female forming tool, in accordance with various embodiments;

FIG. 5B is a partial perspective view of the system of FIG. 5A with the fibrous preform shape formed to the forming tool and a guide rod pulled toward the forming tool by the fibrous preform with the rotary tensioners applying tension to the fibrous preform via the guide rod and associated clamp, in accordance with various embodiments;

FIG. 6 is a partial perspective view of a system for shape forming a fibrous preform with a rotary tensioner mounted to a top surface of the forming tool, in accordance with various embodiments;

FIG. 7 is a partial perspective view of a system for shape forming a fibrous preform with a rotary tensioner mounted to a side surface of the forming tool, in accordance with various embodiments;

DETAILED DESCRIPTION

Figure 1A:
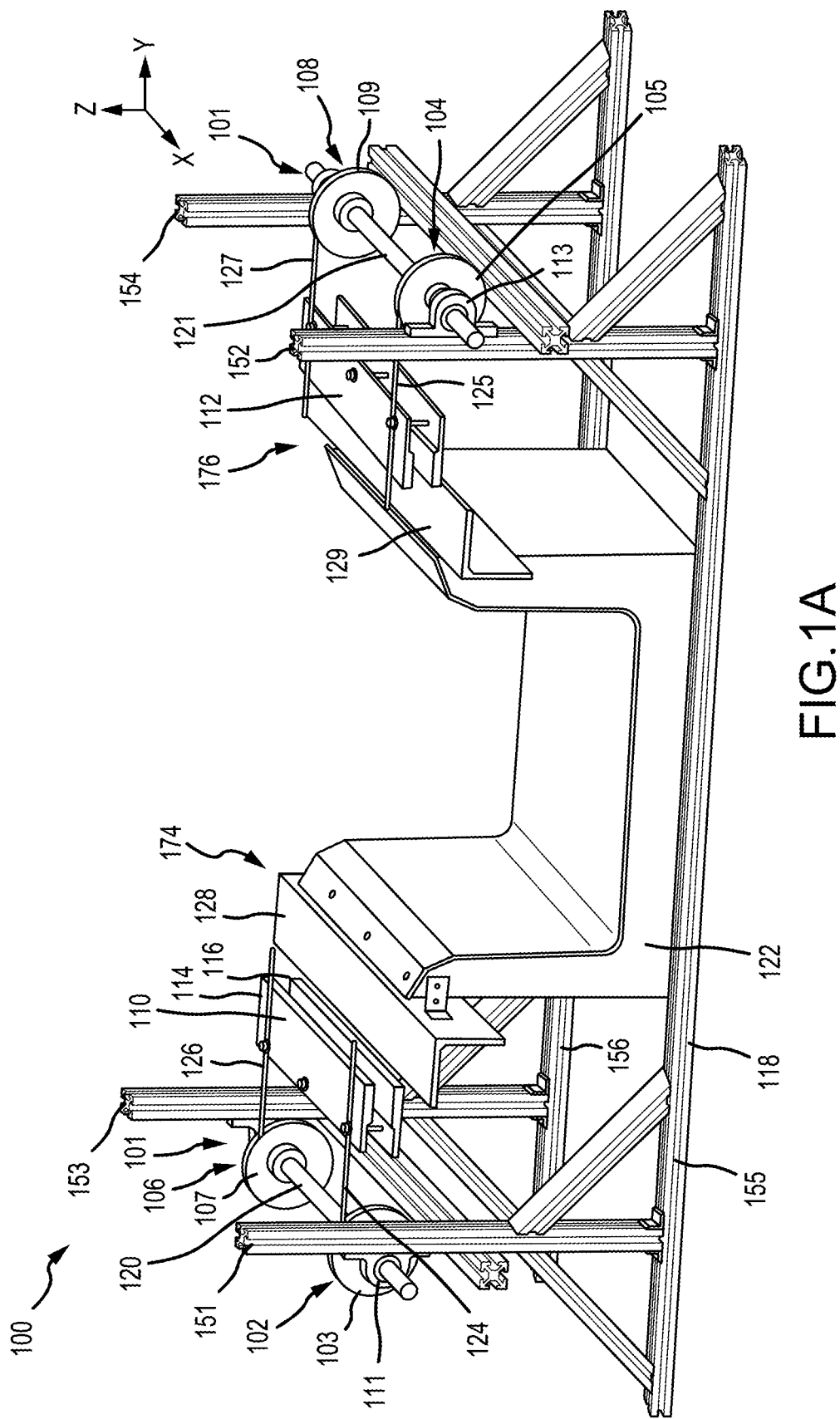
FIG. 1A is a perspective view of a shape forming system for pre-carbonization compression and shaping a fibrous preform into a shaped body, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "CVI/CVD" may refer to chemical vapor infiltration and/or chemical vapor deposition. Accordingly, CVI/CVD may refer to chemical vapor infiltration or deposition or both.

Several methods exist for manufacturing carbon/carbon ("C/C") materials depending on the part geometries and the end application performance requirements. One method involves starting with a carbon fiber or fabric that is pre-impregnated with a polymer resin. Process steps for forming a shaped part include the steps of laying-up of several layers of the pre-impregnated fabric onto a tool to form a preform, cure of the fiber-reinforced resin preform to form a rigid shape, pyrolysis of the cured shape to decompose or pyrolyze the resin leaving behind carbon fiber and a matrix comprising of carbon or substantially carbon (>85% by weight of the pyrolyzed resin). In this method, additional polymer resin infiltration and pyrolysis cycles may be employed to increase the amount of carbon matrix in the composites, or until the part achieves the desired density. A second method involves starting with a dry fibrous preform, forming the preform into a shape using a closed molding die or other similar suitable forming methods, fixturing the formed shape into suitable graphite fixtures designed to maintain the formed shape but with perforations for allowing gases to flow, and depositing carbon matrix on the fibers by chemical vapor infiltration (CVI) using suitable reactant gases, pressures and temperatures to fill the voids between the fibers and densify the part. The chemical vapor infiltration cycles may continue, in conjunction with intermediate machining of the surfaces of the preform between infiltration cycles if desired, until the desired part density is achieved.

The fibrous preforms in the foregoing method may consist of carbon fibers, silicon carbide fibers, or a precursor to these fibers. In various embodiments, the fibrous preform may comprise of oxidized polyacrylonitrile (PAN) fiber, or OPF. In various embodiments, the polymer resins used for infiltration may comprise any suitable resin that may be infused or impregnated into the carbon fabric layers or other fibrous preform, forming shapes and when heated to suitable temperatures is able to pyrolyze or decompose leaving behind carbon, or substantially carbon (>85%). Examples of resins include, but are not limited to, phenolic resins, mesopitch, benzoxazines, poly-ether ether ketone (PEEK), poly-aryl ether ketone (PAEK), or combinations thereof.

Combinations of these methods may be used and may include variations in preform architecture, infiltration resin type, and chemical vapor infiltration conditions. For example, a method may involve a combination of layup, cure, and pyrolysis of a carbon fiber reinforced polymer resin matrix composite, and followed by additional densification of the composite using chemical vapor infiltration.

In the methods involving the use of OPF for making preforms, the preforms are carbonized to convert the OPF into carbon fibers prior to further densification with resin or chemical vapor infiltration. Typically, fibrous preforms are carbonized by placing the preforms in a furnace with an inert atmosphere. As is well-understood, the heat of the furnace causes a chemical conversion which drives off the non-carbon chemical species from the preform. The resulting preform generally has the same fibrous structure as the fibrous preform before carbonizing; however, the OPF have been converted to substantially carbon, with total carbon content generally greater than 85% by weight. After the preform has been carbonized (for OPF), the preform is densified. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix.

In the methods involving densification by chemical vapor infiltration, this commonly involves heating the furnace and the carbonized preforms, and flowing hydrocarbon gases into the furnace and around and through the fibrous preforms. As a result, carbon from the hydrocarbon gases separates from the gases and is deposited on and within the fibrous preforms. When the densification step is completed, the resulting C/C part has a carbon fiber structure with a carbon matrix infiltrated into the preform and surrounding the fiber structure, thereby deriving the name "carbon/carbon".

C/C parts of the present disclosure may be formed using fabrics that are shape-formed prior to carbonization. C/C parts of the present disclosure may be formed using multi-axial, non-crimp, stitch-bonded fabrics that are shape-formed prior to carbonization. C/C parts of the present disclosure may be particularly useful for high temperature aerospace applications. C/C parts of the present disclosure may be especially useful in these applications because of the superior high temperature characteristics of C/C material. In particular, the carbon/carbon material used in C/C parts is a good conductor of heat and is able to dissipate heat generated during high temperature conditions. Carbon/carbon material is also highly resistant to heat damage, and thus, may be capable of sustaining forces during severe conditions without mechanical failure. Carbon/Carbon material also exhibits suitable friction coefficient and wear performance capable of use in braking applications.

C/C components including leading edges, structural members and other contour-shape carbon composites are often produced as 2D planar structures (i.e., flat, planar components); however, these materials tend to maintain low interlaminar properties. A shape formed 3D C/C part offers opportunity for similar in-plane C/C properties with higher interlaminar properties than flat plate C/C.

Disclosed herein are systems and methods for forming a preform into a shaped body. The systems and methods relate to complex geometry carbon preforms for C/C composites with curvatures along one or more planes. To properly form a shaped body, it is desirable to apply appropriate tension to the preform, such that the preform may be stretched around various corners and radii with little to no wrinkling or fiber kinking—important to achieve target mechanical properties and reproducibility. Systems and methods of the present disclosure include a system to provide tension via a rotating assembly while a preform is assembled in a match-die shape-forming tool assembly. The rotary tensioner(s) can provide uniform tension while a flat, fibrous preform board is initially formed to a shape with complex curvature. To provide this tensioning, a plurality of clamping assemblies attached to rotating tensioners (constant tension pulleys/rotary drums (mechanical), rotary actuators (electrical), or similar), in various embodiments via interfacing straps, can grip the edges of the preform board. As the preform board is drawn into the female die in the initial forming operation, the constant tension provided by the rotating assembly imparts consistent tension on the preform edges, mitigating wrinkling in the part. The rotary tensioning assembly may be attached to the match-die tooling assembly or be a stand-alone assembly. After initial forming and tensioning, the rotary tensioners may remain attached to the preform or may be removed. The preform may then be fully formed and compressed.

With reference to FIG. 1A, a perspective view of a system 100 for shape forming a fibrous preform is illustrated, in accordance with various embodiments. System 100 generally includes one or more rotary tensioners 101 (e.g., a first rotary tensioner 102, second rotary tensioner 104, third rotary tensioner 106, and/or fourth rotary tensioner 108) and one or more tensioning clamps (e.g., first clamp 110 and/or second clamp 112). Rotary tensioners 102, 104, 106, and/or 108 are collectively referred to herein as rotary tensioners 101, and it should be understood that rotary tensioners 101 may include any number or combination of rotary tensioners and is not meant to be limited to the rotary tensioners of the illustrated embodiment. Rotary tensioners 101 may comprise constant tension pulleys and/or electro-mechanical rotary actuators. As used herein, the term "constant tension pulley" refers to a pulley that applies consistent tension (i.e., the tension value is unchanged) to the fibrous preform 130 independent of a rotational position of the pulley, for example via a dead weight, a spring, or an electro-mechanical rotary actuator applying counter-rotation to the pulley. Rotary tensioners 101 comprising electro-mechanical rotary actuators may be controlled by an electric motor, a servo-motor, a stepper motor, or the like. First clamp 110 may comprise a first plate 114 moveable with respect to a second plate 116, wherein the first clamp 110 is configured to receive and compress a lateral side of a preform between the first plate 114 and the second plate 116. In various embodiments, first plate 114 is bolted to second plate 116, whereby the clamping force of first clamp 110 can be adjusted. Second clamp 112 can be structurally similar to first clamp 110.

System 100 may further include a support frame 118 for the rotary tensioners 101. First rotary tensioner 102, second rotary tensioner 104, third rotary tensioner 106, and/or fourth rotary tensioner 108 may be mounted to a support frame 118; though in various embodiments as described in further detail herein the rotary tensioners 101 may be mounted to forming tool 122 and support frame 118 may be omitted. Support frame 118 may comprise a structural support for supporting the rotary tensioners (e.g., on a ground surface). In this regard, support frame 118 may react forces through the rotary tensioners 101 separate from forming tool 122. Stated differently, support frame 118 may be spaced apart from forming tool 122 and/or may transfer tension forces from the rotary tensioners 101 to a ground surface (or other support surface) independent of forming tool 122. Support frame 118 can be built using metal rods, channels, beams, etc. In various embodiments, support frame 118 comprises aluminum extrusions comprising a T-slotted profile, such as those available from 80/20 Inc. of Columbia City, Ind.

System 100 may further include forming tool 122. With momentary reference to FIG. 2, forming tool 122 may be a female forming tool 222 which extends longitudinally along a longitudinal centerline 206 of the female forming tool 222 (e.g., along X-axis) between and to a first end 270 of the female forming tool 222 and a second end 272 of the female forming tool 222. The female forming tool 222 can extend laterally (e.g., along a Y-axis) between and to a first side 274 of the female forming tool 222 and a second side 276 of the female forming tool 222. The female forming tool 222 can extend vertically (e.g., along a Z-axis) between and to a bottom side 278 of the female forming tool 222 and a top side 280 of the female forming tool 222.

The female forming tool 222 is configured with at least one die recess 282; e.g., an aperture such as a pocket, a channel, a groove, etc. The die recess 282 of FIG. 2 extends (e.g., partially) vertically into the female forming tool 222 from one or more top surfaces 284 of the female forming tool 222 to a recess surface 286 of the female forming tool 222, where the top surfaces 284 of FIG. 2 are arranged on opposing sides of the recess surface 286 at the female forming tool top side 280. The die recess 282 of FIG. 2 extends longitudinally in (e.g., through) the female forming tool 222, for example, between and to the female forming tool first end 270 and/or the female forming tool second end 272. The die recess 282 of FIG. 2 extends laterally in (e.g., within) the female forming tool 222, for example, between opposing lateral sides of the recess surface 286.

The recess surface 286 is a concave or concave-convex surface and may have a curved geometry; e.g., a three-dimensional (3D) curvature. The recess surface 286 may have a curved (e.g., arcuate, splined, etc.) cross-sectional geometry in a lateral-vertical reference plane; e.g., a Y-Z plane. The recess surface 286 may have a curved (e.g., arcuate, splined, etc.) cross-sectional geometry in a longitudinal-vertical reference plane; e.g., a X-Z plane. This recess curvature may change as the recess surface 286/the die recess 282 extends laterally and/or longitudinally, which may provide the recess surface 286 with a complex 3D curvature. In various embodiments, the recess curvature may remain uniform as the recess surface 286/the die recess 282 extends laterally and/or longitudinally. The recess surface 286 may be configured without any sharp corners or sharp transitions.

In various embodiments, the recess surface 286 comprises a radiused surface 281 which forms a rounded, convex surface transition between a sidewall portion 285 of the recess surface 286 and the female forming tool top surface 284. The fibrous preform may be bent around or over radii surface 625. Radii surface 281 may tend to minimize wrinkling of the fibrous preform during the forming process. Radii surface 281 may extend between and to the female forming tool first end 270 and the female forming tool second end 272. In various embodiments, an angled surface 283 oriented at an angle (e.g., between 5 and 75 degrees) with respect to the female forming tool top surface 284 is disposed between the radii surface 281 and the female forming tool top surface 284. Angled surface 283 may extend between and to the female forming tool first end 270 and the female forming tool second end 272.

With reference again to FIG. 1A, first rotary tensioner 102 and third rotary tensioner 106 are illustrated as being disposed at a first side 174 of forming tool 122 and second rotary tensioner 104 and fourth rotary tensioner 108 are illustrated as being disposed at a second side 176 of forming tool 122. In this regard, rotary tensioners 101 may be configured to apply constant tension to opposing lateral sides of a fibrous preform.

In various embodiments, first rotary tensioner 102 is coupled to third rotary tensioner 106 via a rotary shaft 120. In this manner, first rotary tensioner 102 may spin together with third rotary tensioner 106 via the rotary shaft 120. For example, rotary shaft 120 may be a keyed rotary shaft that interlocks with first rotary tensioner 102 and third rotary tensioner 106. First rotary tensioner 102 may comprise a first pulley 103 mounted to rotary shaft 120 and third rotary tensioner 106 may comprise a third pulley 107 mounted to rotary shaft 120. In this manner, first pulley 103 may spin together with third pulley 107 via the rotary shaft 120. In various embodiments, rotary shaft 120 is mounted to support frame 118 via one or more bearings 111 (e.g., one bearing 111 disposed at each end of the rotary shaft 120) which provide an interface between the rotary shaft 120 and the support frame 118.

In various embodiments, second rotary tensioner 104 is coupled to fourth rotary tensioner 108 via a rotary shaft 121. In this manner, second rotary tensioner 104 may spin together with fourth rotary tensioner 108 via the rotary shaft 121. For example, rotary shaft 121 may be a keyed rotary shaft that interlocks with second rotary tensioner 104 and fourth rotary tensioner 108. Second rotary tensioner 104 may comprise a second pulley 105 mounted to rotary shaft 121 and fourth rotary tensioner 108 may comprise a fourth pulley 109 mounted to rotary shaft 121. In this manner, second pulley 105 may spin together with fourth pulley 109 via the rotary shaft 121. In various embodiments, rotary shaft 121 is mounted to support frame 118 via one or more bearings 113 (e.g., one bearing 113 disposed at each end of the rotary shaft 121) which provide an interface between the rotary shaft 121 and the support frame 118.

In various embodiments, first rotary tensioner 102 is coupled to first clamp 110 via a first flexible member 124, such as a flexible belt, chain, cord, or the like. In various embodiments, second rotary tensioner 104 is coupled to second clamp 112 via a second flexible member 125, such as a flexible belt, chain, cord, or the like. In various embodiments, third rotary tensioner 106 is coupled to first clamp 110 via a third flexible member 126, such as a flexible belt, chain, cord, or the like. In various embodiments, fourth rotary tensioner 108 is coupled to second clamp 112 via a fourth flexible member 127, such as a flexible belt, chain, cord, or the like.

In various embodiments, first rotary tensioner 102 is slidably coupled to a first support frame member 151 (e.g., a vertical post), whereby a position of the first rotary tensioner 102 with respect to the forming tool 122 is adjustable in a first dimension (i.e., along the Z-axis). Third rotary tensioner 106 can similarly be slidably coupled to a third support frame member 153 (e.g., a vertical post), whereby a position of the third rotary tensioner 106 with respect to the forming tool 122 is adjustable in the first dimension (i.e., along the Z-axis). In this regard, a height of the first rotary tensioner 102 and/or third rotary tensioner 106 can be adjusted depending on a height of forming tool 122 and/or a desired direction of the tensioning force applied to the fibrous preform 130. Translating tensioners may allow either independent or coupled tensioners to be repositioned to better form specific regions of a preform geometry. In various embodiments, the position of the first rotary tensioner 102 with respect to the forming tool 122 can made adjustable by mounting the first bearing 111 to the first support frame member 151 using a rail and carriage system. In this manner, the first bearing 111 may be configured to slide or translate along first support frame member 151.

In various embodiments, second rotary tensioner 104 is similarly slidably coupled to a second support frame member 152 (e.g., a vertical post), whereby a position of the second rotary tensioner 104 with respect to the forming tool 122 is adjustable in the first dimension (i.e., along the Z-axis). In various embodiments, third rotary tensioner 106 is similarly slidably coupled to a third support frame member 153 (e.g., a vertical post), whereby a position of the third rotary tensioner 106 with respect to the forming tool 122 is adjustable in the first dimension (i.e., along the Z-axis). Fourth rotary tensioner 108 can also similarly be slidably coupled to a fourth support frame member 154 (e.g., a vertical post), whereby a position of the fourth rotary tensioner 108 with respect to the forming tool 122 is adjustable in the first dimension (i.e., along the Z-axis).

In various embodiments, first support frame member 151 and/or second support frame member 152 are slidably coupled to a fifth support frame member 155 (e.g., a horizontal beam), whereby a position of the first rotary tensioner 102 and/or the second rotary tensioner 104 with respect to the forming tool 122 is adjustable in a second dimension (i.e., along the Y-axis). In various embodiments, third support frame member 153 and/or fourth support frame member 154 are slidably coupled to a sixth support frame member 156 (e.g., a horizontal beam), whereby a position of the third rotary tensioner 106 and/or the fourth rotary tensioner 108 with respect to the forming tool 122 is adjustable in the second dimension (i.e., along the Y-axis). In this manner, the rotary tensioners 101 may be adjusted laterally with respect to the forming tool 122 depending on the size of the forming tool 122 and the desired tension.

Figure 1B:
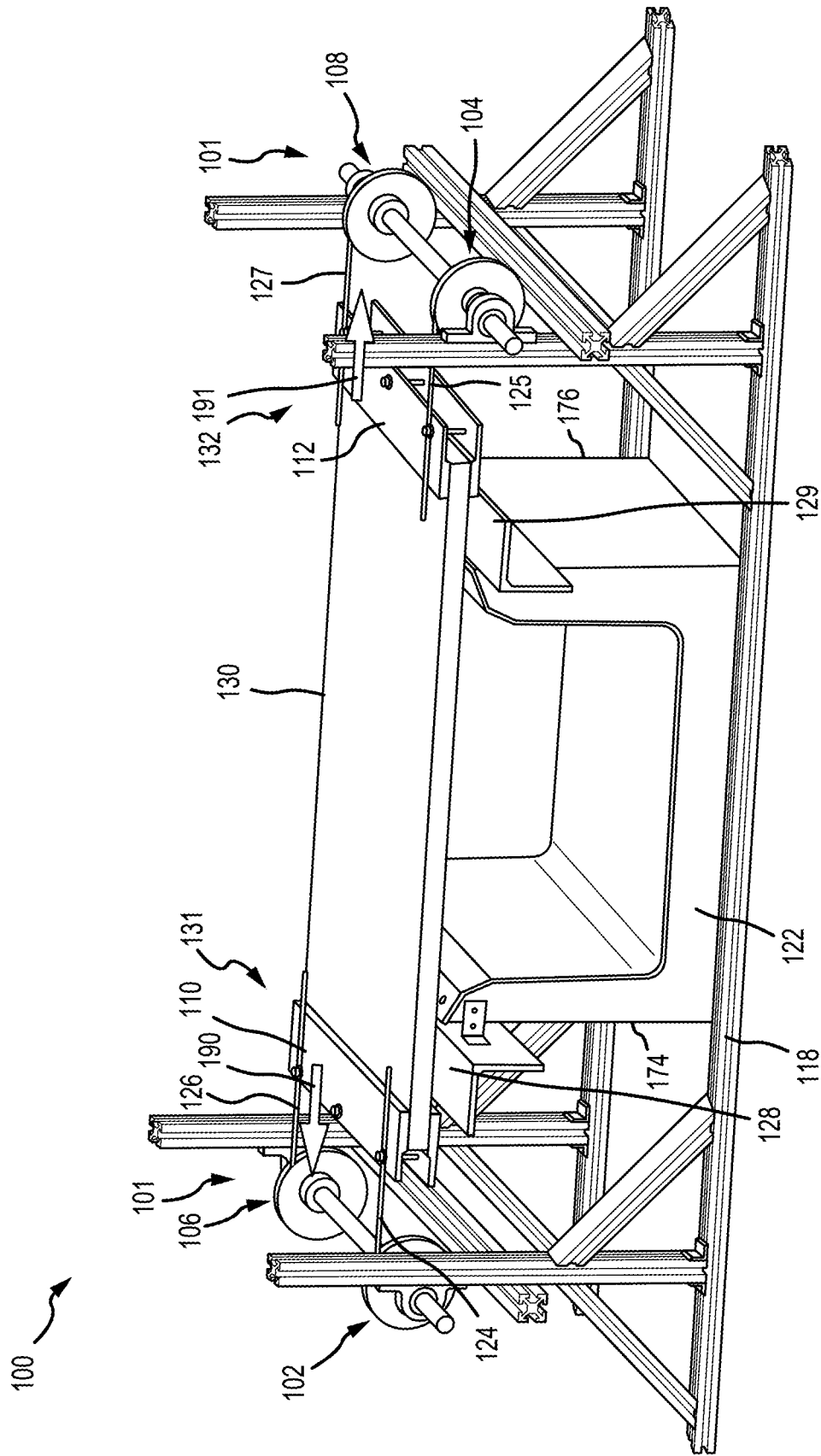
FIG. 1B is a perspective view of the shape forming system of FIG. 1A with a flat fibrous preform installed therein, in accordance with various embodiments.

With reference to FIG. 1B, a perspective view of a fibrous preform 130 installed in system 100 is illustrated, in accordance with various embodiments. FIG. 1A through FIG. 1F show the order of operations of shape forming fibrous preform 130 with system 100, in accordance with various embodiments. In this regard, flat fibrous preform 130 may be placed over forming tool 122 at the beginning of the shape forming process. A first preform support 128 may be coupled to the forming tool 122 at first side 174 and a second preform support 129 may be coupled to the forming tool 122 at second side 176. First preform support 128 and second preform support 129 may provide a surface at opposing lateral sides 174, 176 of forming tool 122 to support the fibrous preform 130 and/or tensioning clamps 110, 112 while the fibrous preform 130 is coupled to the tensioning clamps 110, 112. In various embodiments, first preform support 128 and second preform support 129 are flush with the top surface of forming tool 122. In various embodiments, first preform support 128 and second preform support 129 protrude above the top surface of forming tool 122.

With preform 130 installed in first clamp 110 and second clamp 112, first and third rotary tensioners 102, 106 can apply a first tension, represented by arrow 190, onto fibrous preform 130 and second and fourth rotary tensioners 104, 108 can apply a second tension, represented by arrow 191, onto fibrous preform 130. For example, first and third rotary tensioners 102, 106 may be rotationally biased in a first rotational direction (e.g., the counter-clockwise direction in FIG. 1C)—e.g., via a spring, a deadweight, electro-mechanical rotary actuator, etc.—and thereby apply a constant first tension 190 to fibrous preform 130. Similarly, second and fourth rotary tensioners 104, 108 may be rotationally biased in a second rotational direction (e.g., the clockwise direction in FIG. 1C)—e.g., via a spring, a deadweight, electro-mechanical rotary actuator, etc.—and thereby apply a constant second tension 191 to fibrous preform 130. In various embodiments, the first and second tensions 190, 191 are equal. In various embodiments, the first and second tensions 190, 191 are equal and in opposite directions.

Figures 9A, 9B, 9C:
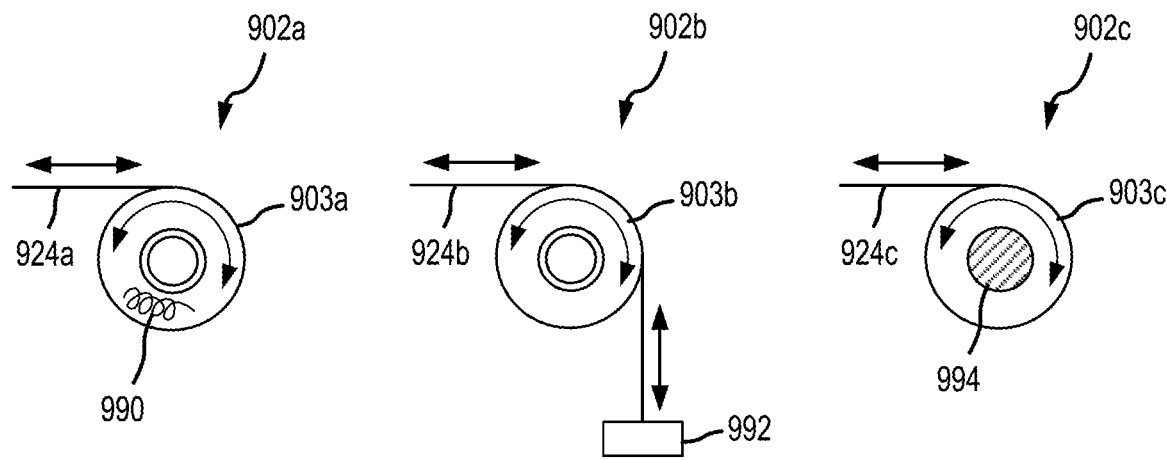
FIG. 9A, FIG. 9B, and FIG. 9C are schematic views of rotary tensioners, in accordance with various embodiments.

With momentary reference to FIG. 9A, a rotary tensioner 902a is schematically illustrated with a spring member 990 (e.g., a coil spring, a leaf spring, a torsion spring, a disk spring, an extension spring, a compression spring, or the like) configured to bias pulley 903a in a first rotational direction (e.g., the clockwise direction in FIG. 9A) against a tension applied to a fibrous preform via flexible member 924a. With momentary reference to FIG. 9B, a rotary tensioner 902b is schematically illustrated with a dead weight 992 configured to bias pulley 903a in a first rotational direction (e.g., the clockwise direction in FIG. 9B) against a tension applied to a fibrous preform via flexible member 924b. Dead weight 992 may be suspended from pulley 903b with flexible member 924b. With momentary reference to FIG. 9C, a rotary tensioner 902c is schematically illustrated with an electric motor 994 operatively coupled to pulley 903a (e.g., configured to apply a torque to pulley 903c) and configured to bias pulley 903c in a first rotational direction (e.g., the clockwise direction in FIG. 9C) against a tension applied to a fibrous preform via flexible member 924c.

Figure 1C:
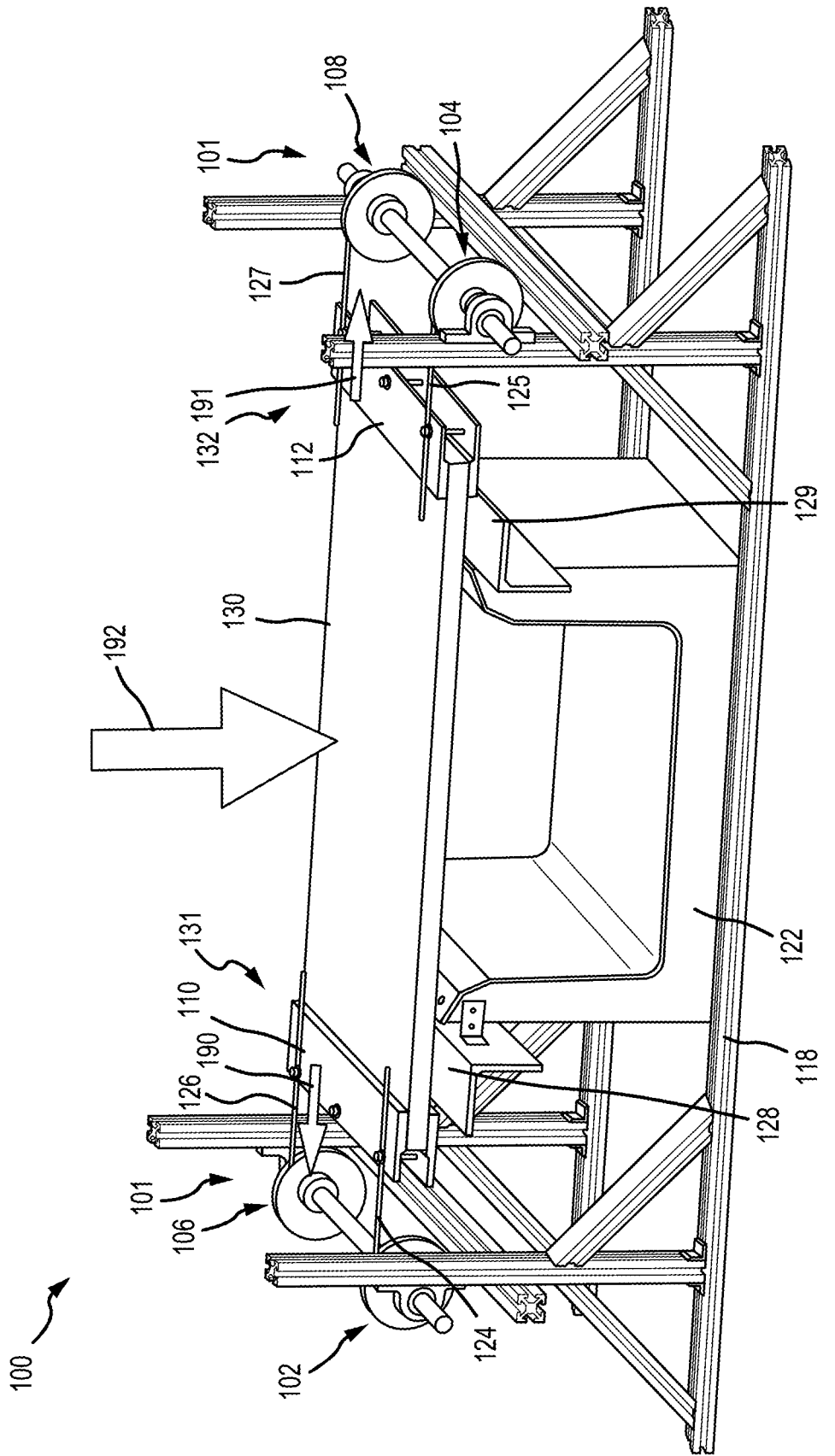
FIG. 1C is a perspective view of the shape forming system of FIG. 1B with a force being applied to the flat fibrous preform, in accordance with various embodiments.

With reference to FIG. 1C, a force, represented by arrow 192, can be applied to a middle section of the fibrous preform 130 (e.g., by hand or by a tool such as a male die). Tensioning via the rotary tensioners 101 provides tension/stretch to the fibrous preform 130, which mitigates wrinkle formation as the fibrous preform is moved to conform to forming tool 122.

With reference to FIG. 1D, as the fibrous preform 130 is moved into the die recess 182 of forming tool 122, second clamp 112 may be pulled away from rotary tensioners 101 (e.g., second rotary tensioner 104 and fourth rotary tensioner 108) and second flexible member 125 and fourth flexible member 127 may be at least partially unwound from second rotary tensioner 104 and fourth rotary tensioner 108, respectively. As the second clamp 112 is pulled away from rotary tensioners 101, rotary tensioners 101 may be configured to apply a constant tension 191 to preform 130. In this regard, second clamp 112 is moveable with respect to forming tool 122. Likewise, with momentary reference to FIG. 1C, as the fibrous preform 130 is moved into the die recess 182 of forming tool 122, first clamp 110 may be pulled away from rotary tensioners 101 (e.g., first rotary tensioner 102 and third rotary tensioner 106) and first flexible member 124 and third flexible member 126 may be at least partially unwound from first rotary tensioner 102 and third rotary tensioner 106, respectively. As the first clamp 110 is pulled away from rotary tensioners 101, rotary tensioners 101 may be configured to apply a constant tension 190 to preform 130. In this regard, first clamp 110 is moveable with respect to forming tool 122.

Figure 1E:
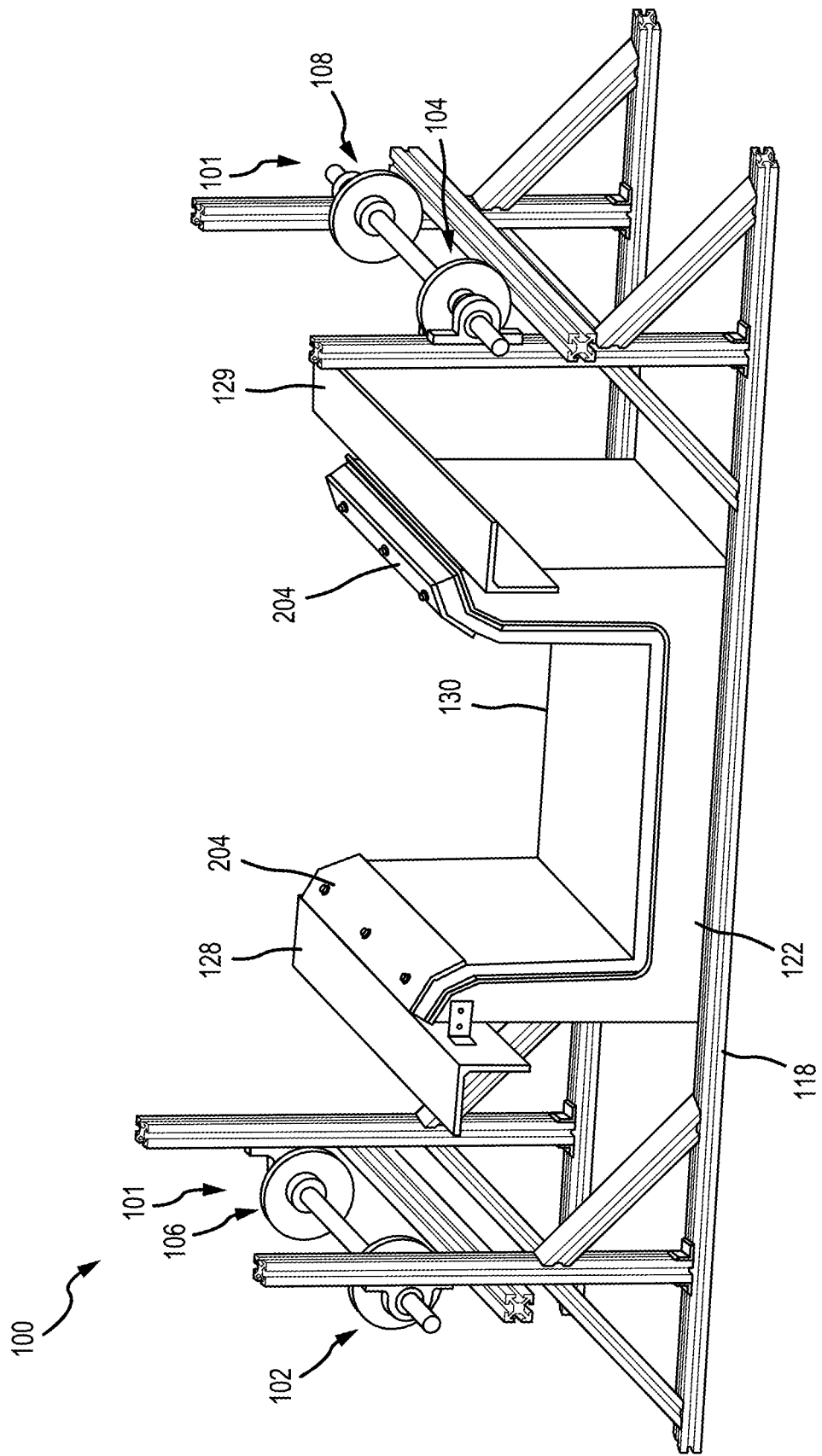
FIG. 1E is a perspective view of the shape forming system of FIG. 1D with clamps removed from the fibrous preform and gripper plates installed, in accordance with various embodiments.

With reference to FIG. 1E, after the fibrous preform 130 is satisfactorily pushed down, the tensioning clamps 110, 112 can be released, and gripper plates 204 can be applied to the sides of the fibrous preform 130. Additional compression and forming may be performed (e.g., see FIG. 1F) and the fibrous preform 130 may then undergo carbonization and/or densification, as desired.

Figure 1F:
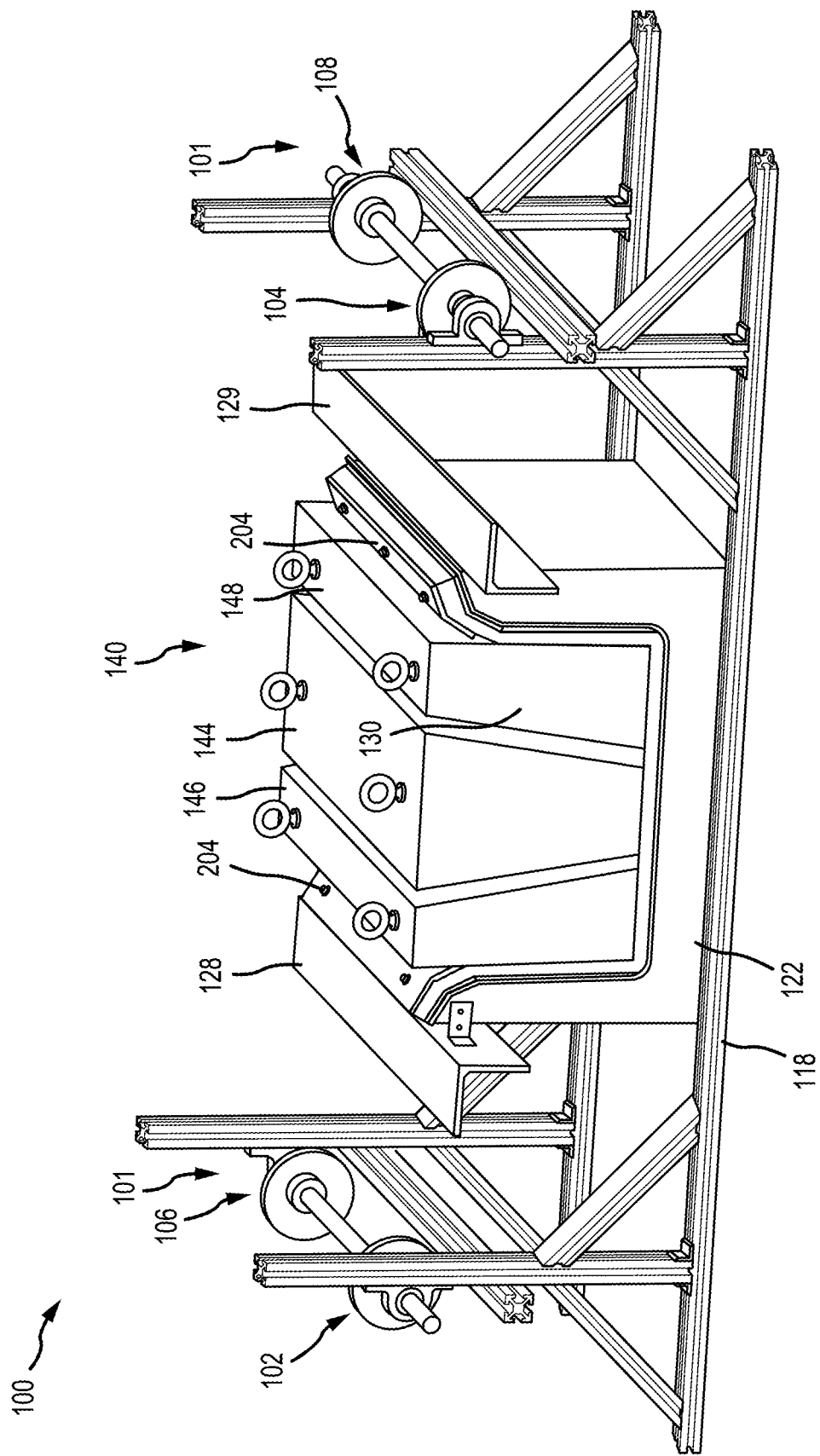
FIG. 1F is a perspective view of the shape forming system of FIG. 1E with a male die assembly installed over the fibrous preform, in accordance with various embodiments.

In various embodiments, tensioning clamps 110, 112 may remain engaged (instead of the gripper plates 204) during the baseline forming process (e.g., before carbonization and/or densification). With reference to FIG. 1F, a perspective view of a fibrous preform 130 installed in forming tool 122 after being shape formed using system 100 is illustrated, in accordance with various embodiments. In various embodiments, fibrous preform 130 is shape formed between one or more male dies (e.g., a wedge 144, a first plug 146, and a second plug 148) and the forming tool 122, collectively referred to herein as a shape-forming tool arrangement 140, for pre-carbonization compression and shaping. Shape-forming tool arrangement 140 may be configured as a matched die forming tool. Shape forming tool arrangement 140 may be configured for forming a shaped fibrous preform 130 from a multi-layered preform; e.g., a stack of a plurality of layers of material. Shape forming tool arrangement 140 may include a multi-component wedge-based press fixture comprising female forming tool 122 and a multi-piece wedge and plug arrangement comprising a wedge 144, a first plug 146, and a second plug 148. This wedge-and-plug tooling design allows the shape forming tool arrangement 140 to have enough flexibility to maintain pressure application on the side walls of the fibrous preform 130 as the thickness of the material decreases during the pre-carbonization compression process. In various embodiments, female forming tool 122, wedge 144, first plug 146, and second plug 148 are made from a metal material.

Figure 3A:
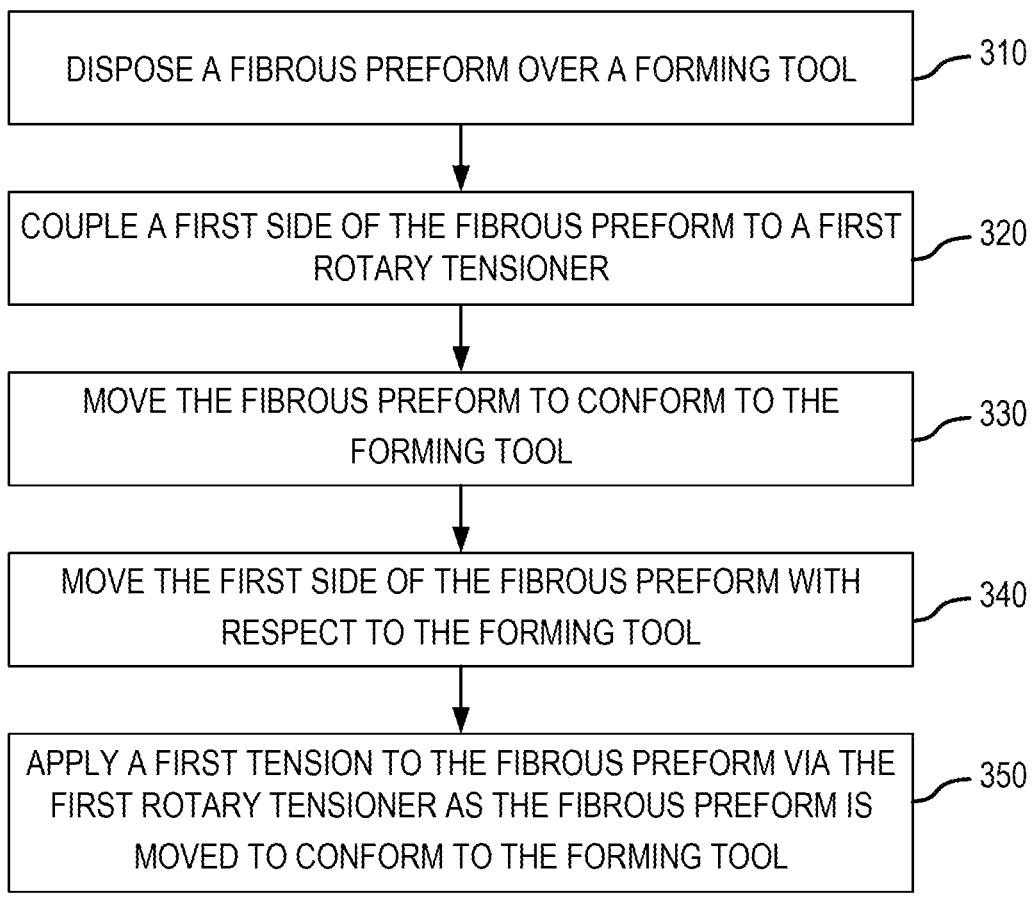
FIG. 3A and FIG. 3B are flow diagrams of methods for forming a fibrous preform into a shaped body, in accordance with various embodiments.

With reference to FIG. 3A, a flow diagram of a method 300 for forming a fibrous preform 130 into a shaped body is provided, in accordance with various embodiments. For ease of description, the method 300 is described below with reference to FIG. 1A through FIG. 1F. The method 300 of the present disclosure, however, is not limited to use of the exemplary system 100 of FIG. 1A through FIG. 1F.

Step 310 includes disposing fibrous preform 130 over forming tool 122 (see FIG. 1B).

Step 320 includes coupling a first side 131 of the fibrous preform 130 to a first rotary tensioner 102. For example, first side 131 may be clamped to first clamp 110 and coupled to first rotary tensioner 102 via flexible member 124. It should be understood that step 320 may further include coupling first side 131 of the fibrous preform 130 to third rotary tensioner 106, depending on the number of rotary tensioners 101 provided at the first side 131 of fibrous preform 130.

Step 330 includes moving the fibrous preform 130 to conform to the forming tool 122 (see FIG. 1C and FIG. 1D).

For example, force 192 can be applied to a middle section of the fibrous preform 130 to push the fibrous preform 130 against the forming tool 122.

Step 340 includes moving the first side 131 of the fibrous preform 130 with respect to the forming tool 122 in response to moving the fibrous preform 130 to conform to the forming tool 122. For example, fibrous preform 130 may be moved against forming tool 122 against the tensioning bias of first rotary tensioner 102. FIG. 1D illustrates the second side 132 of fibrous preform 130 moved with respect to forming tool 122, though it should be understood that the first side 131 can be similarly moved with respect to forming tool 122 (e.g., first side 131 can move in a mirrored fashion to the second side 132 as illustrated in FIG. 1D).

Step 350 includes applying a first tension 190 to the fibrous preform 130 via the first rotary tensioner 102 as the fibrous preform 130 is moved to conform to the forming tool 122 (see FIG. 1C and FIG. 1D). In various embodiments, first rotary tensioner 102 applies a constant first tension 190 to the fibrous preform 130 as the first rotary tensioner 102 rotates. For example, a spring, a dead weight, or a rotary actuator may be configured to apply a consistent rotational bias to the first rotary tensioner 102 to apply a consistent tension to the fibrous preform 130 as the flexible member 124 is unwound from the first pulley 103 in response to the end of the fibrous preform 130 being pulled away from the first rotary tensioner 102. FIG. 1D illustrates the application of second tension 191 to the fibrous preform 130 via the second rotary tensioner 104 as the fibrous preform 130 is moved to conform to the forming tool 122, though it should be understood that the application of first tension 190 to the fibrous preform 130 via the first rotary tensioner 102 can be similarly applied in a mirrored fashion to second tension 191 as illustrated in FIG. 1D).

Figure 3B:
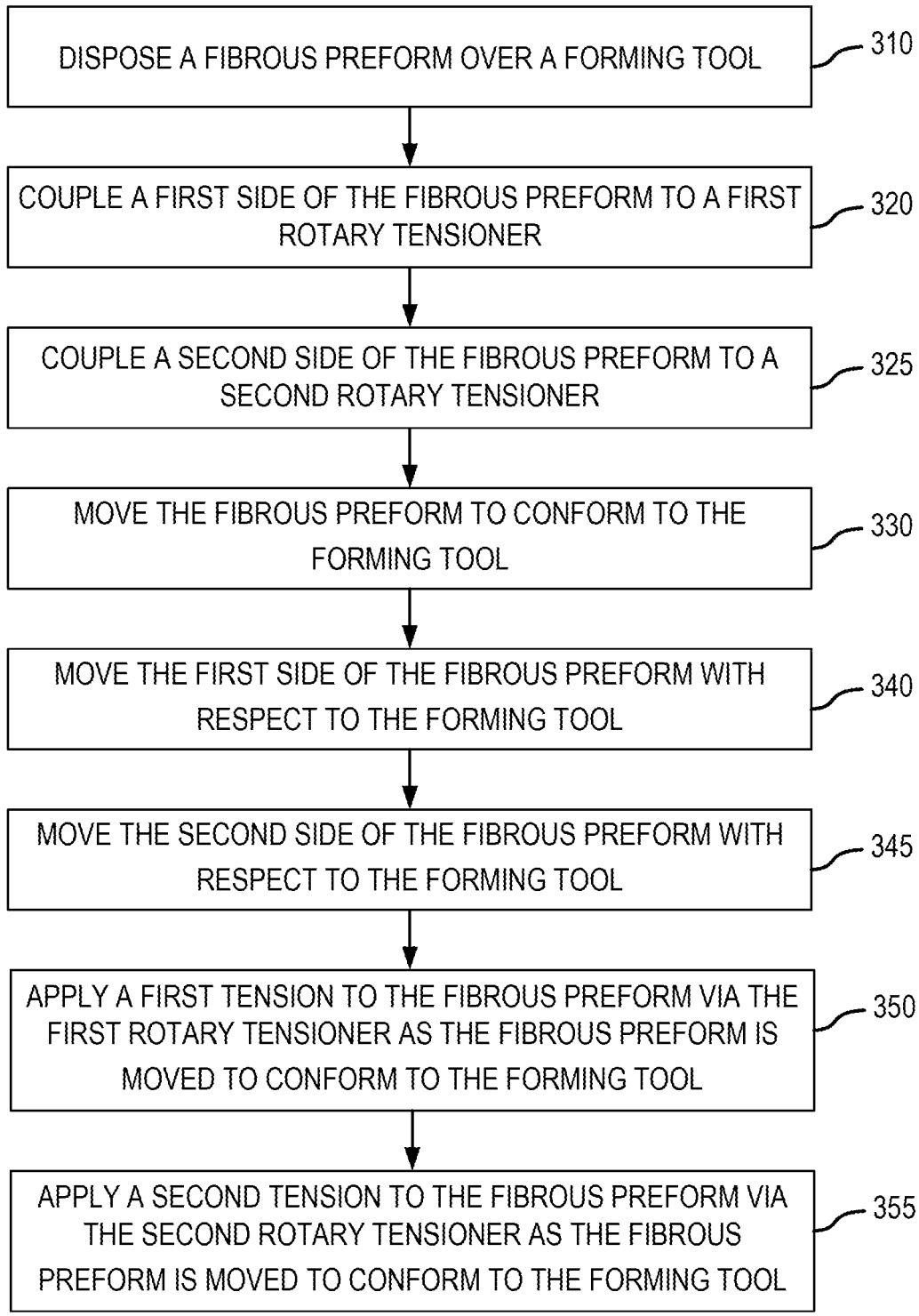

With reference to FIG. 3B, a flow diagram of a method 301 for forming a fibrous preform 130 into a shaped body is provided, in accordance with various embodiments. For ease of description, the method 301 is described below with reference to FIG. 1A through FIG. 1F. The method 301 of the present disclosure, however, is not limited to use of the exemplary system 100 of FIG. 1A through FIG. 1F.

Method 301 is similar to method 300 of FIG. 3A, except that method 301 further includes steps 325, 345, and 355.

Step 325 includes coupling a second side 132 of the fibrous preform 130 to a second rotary tensioner 104. For example, second side 132 may be clamped to second clamp 112 and coupled to second rotary tensioner 104 via flexible member 125. It should be understood that step 325 may further include coupling second side 132 of the fibrous preform 130 to fourth rotary tensioner 108, depending on the number of rotary tensioners 101 provided at the second side 132 of fibrous preform 130.

Step 345 includes moving the second side 132 of the fibrous preform 130 with respect to the forming tool 122 in response to moving the fibrous preform 130 to conform to the forming tool 122. For example, fibrous preform 130 may be moved against forming tool 122 against the tensioning bias of second rotary tensioner 104.

Step 355 includes applying a second tension 191 to the fibrous preform 130 via the second rotary tensioner 104 as the fibrous preform 130 is moved to conform to the forming tool 122 (see FIG. 1C and FIG. 1D). In various embodiments, second rotary tensioner 104 applies a constant second tension 191 to the fibrous preform 130 as the second rotary tensioner 104 rotates.

Figure 4:
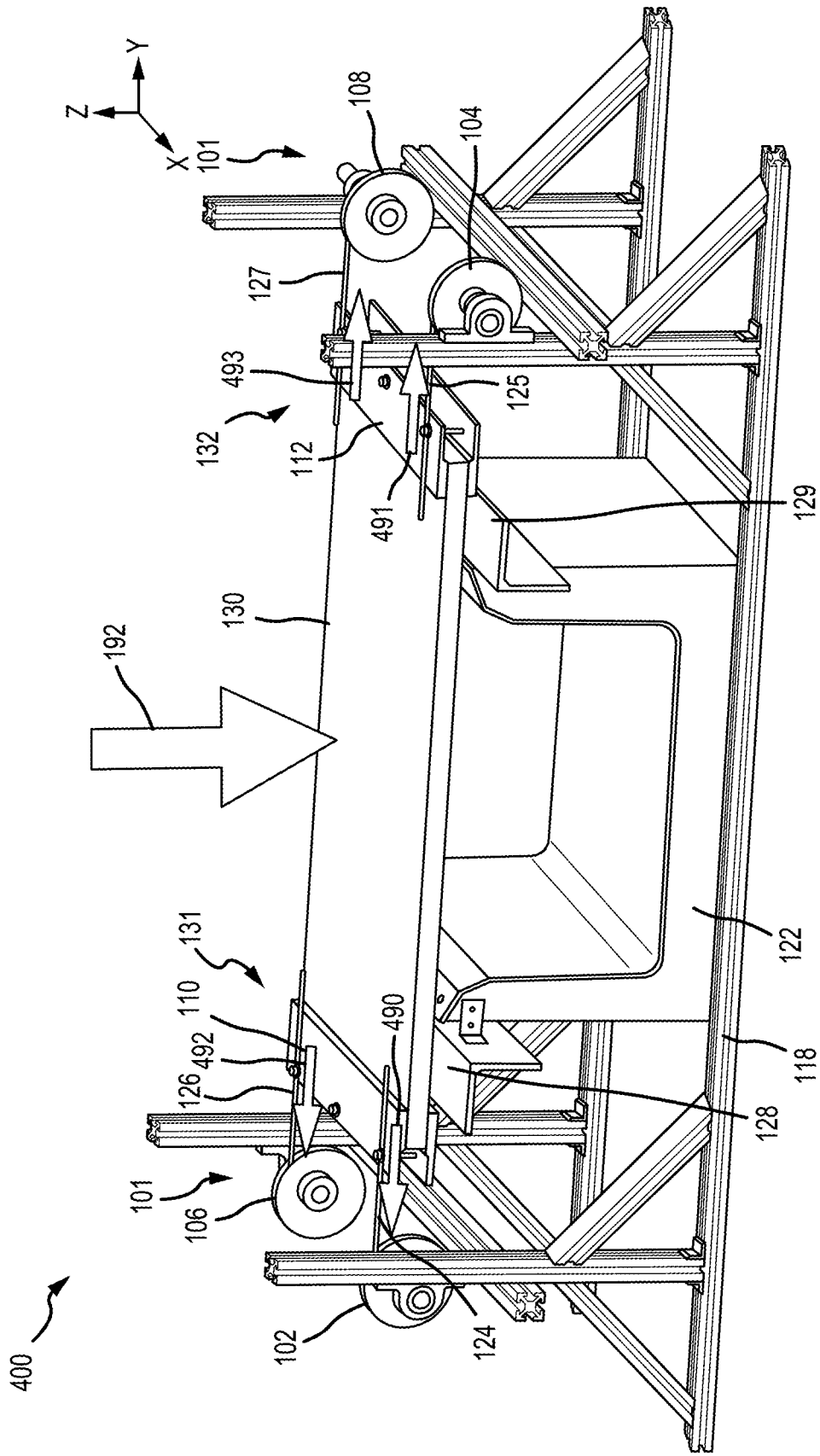
FIG. 4 is a perspective view of a shape forming system with a flat fibrous preform installed therein and independent rotary tensioners applying tension to the fibrous preform, in accordance with various embodiments.

With reference to FIG. 4, a perspective view of a system 400 for shape forming a fibrous preform is illustrated, in accordance with various embodiments. System 400 may be similar to system 100 except that each rotary tensioner is independently controlled or actuated. For example, rotary shafts 120, 121 can be omitted such that first rotary tensioner 102 rotates independently from third rotary tensioner 106 and second rotary tensioner 104 rotates independently from fourth rotary tensioner 108. In this manner, a first tension, represented by arrow 490, applied with first flexible member 124 and first rotary tensioner 102 can be different from a third tension, represented by arrow 492, applied with third flexible member 126 and third rotary tensioner 106. Similarly, a second tension, represented by arrow 491, applied with second flexible member 125 and second rotary tensioner 104 can be different from a fourth tension, represented by arrow 493, applied with fourth flexible member 127 and fourth rotary tensioner 108. In this manner, tension along the length (along the X-direction) of fibrous preform 130 can be varied as desired. Varying a tension along the length of the fibrous preform 130 may be particularly useful for parts that vary in size or geometry along their length.

Figure 5A:
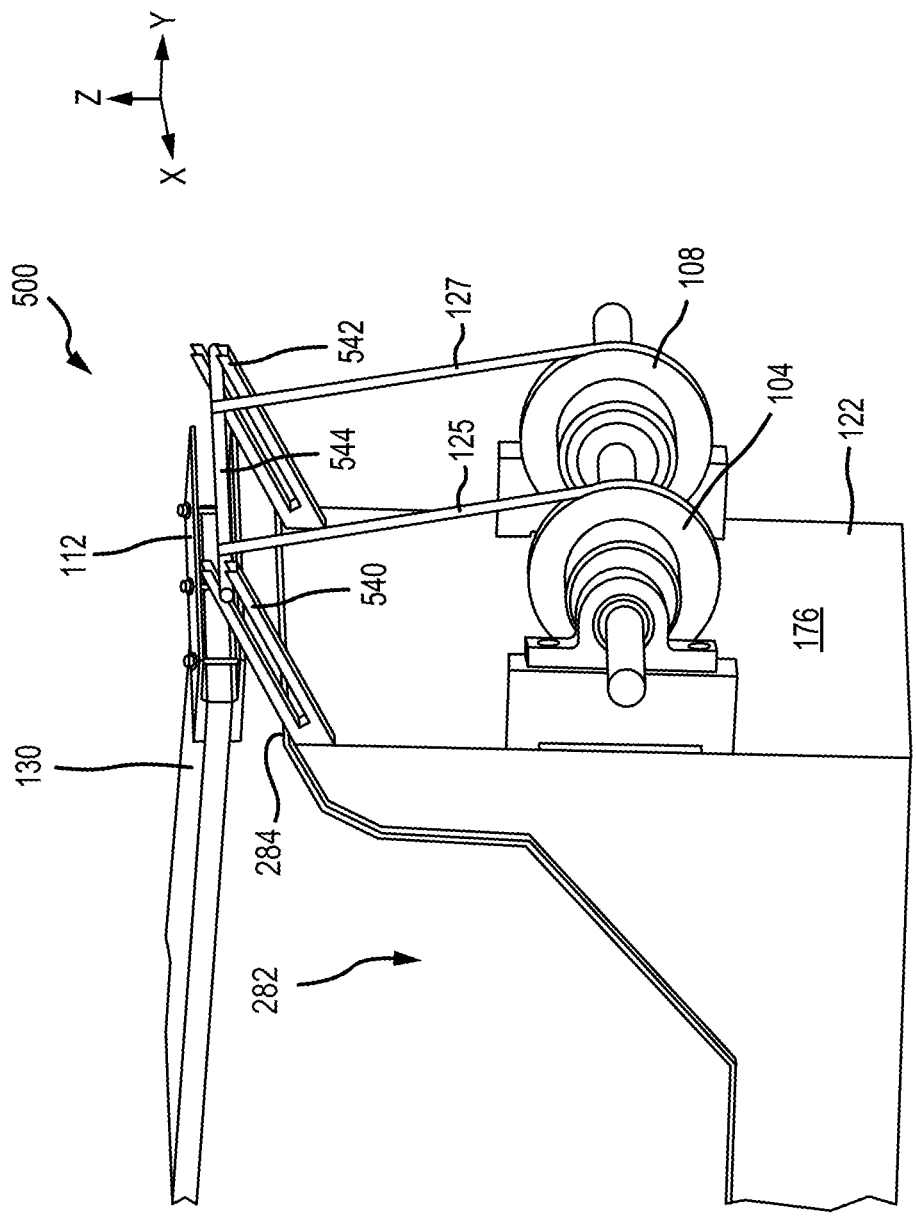
FIG. 5A is a partial perspective view of a system for shape forming a fibrous preform with rotary tensioners mounted to a forming tool and a flat fibrous preform installed thereto before being shape formed, in accordance with various embodiments.

With reference to FIG. 5A and FIG. 5B, a perspective view of a system 500 for shape forming a fibrous preform is illustrated, in accordance with various embodiments. System 500 may be similar to system 100 except that each rotary tensioner is mounted to forming tool 122. For example, second rotary tensioner 104 and fourth rotary tensioner 108 may be mounted to second side 176 of forming tool 122. It should be understood that first rotary tensioner 102 and third rotary tensioner 106 can be similarly mounted to first side 174 of forming tool 122 (e.g., first rotary tensioner 102 and third rotary tensioner 106 can be similarly mounted to first side 174 of forming tool 122 in a mirrored fashion to the second rotary tensioner 104 and fourth rotary tensioner 108 as illustrated in FIG. 5B).

In various embodiments, system 500 further includes a first bracket 540 and a second bracket 542 extending from forming tool 122 (e.g., mounted to second side 176). It should be understood that system 500 can similarly include a third bracket and a fourth bracket mounted to first side 174 of forming tool 122 (e.g., the third and fourth brackets can be similarly mounted to first side 174 of forming tool 122 in a mirrored fashion to first bracket 540 and second bracket 542 as illustrated in FIG. 5A). First bracket 540 and second bracket 542 can serve as a resting surface for the fibrous preform 130 to rest during the shape forming process.

In various embodiments, system 500 further includes a guide rod 544 operatively coupled to the first and second brackets 540, 542 and the second clamp 112. It should be understood that system 500 can similarly include a second guide rod operatively coupled to the third and fourth brackets and the first clamp 110 (e.g., the guide rod can be similarly coupled to the third and fourth brackets and the first clamp 110 in a mirrored fashion to guide rod 544 as illustrated in FIG. 5A). Guide rod 544 may be coupled (e.g., via a bolted connection, a weld, a braze, or the like) to second clamp 112. Guide rod 544 may be slidingly coupled to first bracket 540 and second bracket 542. Flexible member 125 and flexible member 127 can be attached to guide rod 544. Flexible member 125 and flexible member 127 can be disposed between first bracket 540 and second bracket 542.

In various embodiments, first and second brackets 540, 542 can be angled such that guide rod 544 slides from above a top surface 284 of forming tool 122 and beyond second side 176 (see FIG. 5A), downward toward top surface 284 and laterally toward second side 176 (see FIG. 5B) in response to fibrous preform 130 being formed to forming tool 122. In this manner, guide rod 544 may be guided by first and second brackets 540, 542 to move both vertically and laterally with respect to forming tool 122 (see FIG. 5B) in response to the fibrous preform 130 being formed to forming tool 122. In various embodiments, flexible members 125, 127 unwind from rotary tensioners 104 and 108, respectively, in response to guide rod 544 being pulled toward forming tool 122 by fibrous preform 130. Rotary tensioners 104 and 108 can apply tension to fibrous preform 130 (via flexible members 125, 127, guide rod 544, and clamp 112) as the fibrous preform 130 is formed.

In this regard, guide rod 544 and brackets 540, 542 can aid in the alignment and tensioning of the flexible members 125, 127, in accordance with various embodiments. Guide rod 544 can translate towards the forming tool 122 as the fibrous preform 130 is moved into the female die recess 282, providing a constant reinforcement for the flexible members 125, 127. Brackets 540, 542 and/or guide rod 544 can be used to locate the fibrous preform 130 with respect to the forming tool 122 when placing the fibrous preform 130 on top of the forming tool 122.

With reference to FIG. 6, a system 600 for shape forming a fibrous preform is illustrated with a rotary tensioner 602 mounted to forming tool 122, in accordance with various embodiments. System 600 may be similar to system 100 except that each rotary tensioner is mounted to forming tool 122. In various embodiments, rotary tensioner 602 is mounted to a top surface 284 of forming tool 122. Rotary tensioner 602 may include a pulley or a drum 603 configured to rotate with respect to forming tool 122. Rotary tensioner 602 may include a clamp 640 configured to rotate together with the drum 603 whereby an end of the fibrous preform 130 is attached to the drum 603. In various embodiments, the fibrous preform 130 is configured to be received between the drum 603 and the top surface 284 so that tension applied by the rotational bias of the rotary tensioner 602 is generally tangent to the tool surface (e.g., the top surface 284). In this regard, the drum 603 may be biased in the clockwise direction as viewed in FIG. 6 to apply consistent tension to fibrous preform 130.

It should be understood that system 600 can include a plurality of rotary tensioners 602 disposed along the first side of forming tool 122. Moreover, it should be understood that system 600 can further include one or more rotary tensioners disposed along the top surface of the second side of forming tool 122 (e.g., one or more rotary tensioners can be similarly coupled to the top surface of forming tool 122 opposite the die recess from rotary tensioner 602 for applying tension to the opposite side of fibrous preform 130).

With reference to FIG. 7, a system 700 for shape forming a fibrous preform is illustrated with a rotary tensioner 702 mounted to forming tool 122, in accordance with various embodiments. System 700 may be similar to system 600 except that rotary tensioner 702 is mounted to first side 274 of forming tool 122. Rotary tensioner 702 may include a pulley or a drum 703 configured to rotate with respect to forming tool 122. Rotary tensioner 702 may include a clamp 740 configured to rotate together with the drum 703 whereby an end of the fibrous preform 130 is attached to the drum 703. In various embodiments, the drum 703 is flush with the top surface 284 of the forming tool 274 so that tension applied by the rotational bias of the rotary tensioner 702 is generally tangent to the tool surface (e.g., the top surface 284). In this regard, the drum 703 may be biased in the counter-clockwise direction as viewed in FIG. 7 to apply consistent tension to fibrous preform 130.

Figure 8:
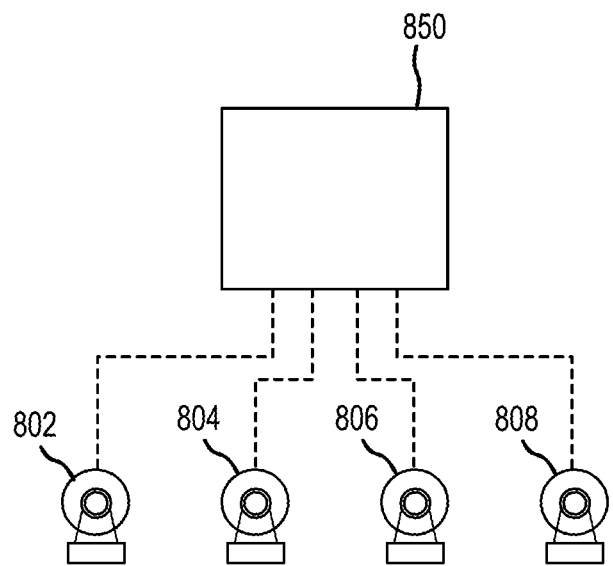
FIG. 8 is a schematic view of a control unit in electronic communication with rotary tensioners of a system for shape forming a fibrous preform, in accordance with various embodiments.

With reference to FIG. 8, a control unit 850 for a system for shape forming a fibrous preform is schematically illustrated, in accordance with various embodiments. Control unit 850 can include one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the control unit 850 controls, at least various parts of, the rotational bias of, and operation of, rotary actuators of the disclosed systems for shape forming a fibrous preform. For example, the control unit 850 can be in electronic communication with a plurality of rotary tensioners (e.g., rotary actuator 802, rotary actuator 804, rotary actuator 806, and/or rotary actuator 808). Control unit 850 may energize the rotary actuators 802, 804, 806, and/or 808 for controlling a rotational bias of the rotary tensioners to control a tension applied to the fibrous preform.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system for shape forming a fibrous preform, comprising:
   a forming tool;
   a first rotary tensioner configured to be disposed at a first side of the forming tool;
   a second rotary tensioner configured to be disposed at a second side of the forming tool;
   a third rotary tensioner configured to be disposed at the first side of the forming tool;
   a fourth rotary tensioner configured to be disposed at the second side of the forming tool; and
   a first clamp configured to be coupled to the first rotary tensioner and the third rotary tensioner, wherein the first clamp is moveable with respect to the forming tool and wherein the first clamp extends from a first end of the forming tool to a second end of the forming tool.

2. The system of claim 1, wherein the forming tool comprises a female forming tool comprising a die recess, the female forming tool extends longitudinally along a longitudinal centerline of the female forming tool between and to a first end of the female forming tool and a second end of the female forming tool, and the female forming tool extends laterally between and to a first side of the female forming tool and a second side of the female forming tool;
   wherein the female forming tool extends vertically between and to a bottom side of the female forming tool and a top side of the female forming tool;
   wherein the die recess extends vertically into the female forming tool from a first top surface and a second top surface of the female forming tool to a recess surface of the female forming tool, wherein the first top surface and the second top surface are arranged on opposing sides of the recess surface at the top side of the female forming tool;
   wherein the die recess extends longitudinally in the female forming tool between and to the first end of the female forming tool and the second end of the female forming tool; and
   wherein the die recess extends laterally in the female forming tool between the first side of the female forming tool and the second side of the female forming tool.

3. The system of claim 1, wherein the first clamp is configured to be coupled to the first rotary tensioner via a first flexible member.

4. The system of claim 1, wherein the first rotary tensioner comprises at least one of a rotary actuator or a constant tension pulley.

5. The system of claim 1, wherein the first rotary tensioner is configured to apply a first tension to the fibrous preform via the first clamp.

6. The system of claim 1, further comprising a frame, wherein the first rotary tensioner is configured to be mounted to the frame.

7. The system of claim 1, further comprising:
   a first preform support configured to be coupled to the first side of the forming tool; and
   a second preform support configured to be coupled to the second side of the forming tool, wherein the first preform support and the second preform support provide a first surface and a second surface, respectively, for supporting the fibrous preform.

* * * * *